United States Patent [19]

Parker

[11] Patent Number: 5,079,678

[45] Date of Patent: Jan. 7, 1992

[54] INTEGRATING LIGHT SOURCE UTILIZING A FLUORESCING REFLECTOR FOR IMPROVED LIGHT EMISSION AND COLOR BALANCE

[75] Inventor: Martin A. Parker, Penfield, N.Y.

[73] Assignee: Eastman Kodak Company, Rochester, N.Y.

[21] Appl. No.: 633,721

[22] Filed: Dec. 24, 1990

[51] Int. Cl.[5] .............................................. F21V 9/16
[52] U.S. Cl. .................................. 362/84; 362/296; 362/310; 358/491
[58] Field of Search ................ 362/84, 298, 301, 302, 362/310, 296; 358/54, 214, 216, 491, 475, 484; 355/67, 228

[56] References Cited

U.S. PATENT DOCUMENTS

| | | |
|---|---|---|
| 3,553,463 | 1/1971 | Dhir ..................................... 358/491 |
| 3,838,282 | 9/1974 | Harris . |
| 3,935,463 | 1/1976 | Jacobsen . |
| 3,956,583 | 5/1976 | Pugsley ............................... 358/491 |
| 4,070,763 | 1/1978 | Carts, Jr. . |
| 4,088,992 | 5/1978 | Kmetz . |
| 4,245,282 | 1/1981 | Sokol ................................... 362/84 |
| 4,285,029 | 8/1981 | McCoy . |
| 4,320,939 | 3/1982 | Mueller . |
| 4,320,940 | 3/1982 | Mueller et al. . |
| 4,367,930 | 1/1983 | Kolb, Jr. . |
| 4,382,272 | 5/1983 | Quella et al. ......................... 362/84 |
| 4,500,173 | 2/1985 | Leibowitz et al. . |
| 4,546,416 | 10/1985 | Pemberton ............................ 362/84 |
| 4,626,071 | 12/1986 | Wada et al. . |
| 4,641,925 | 2/1987 | Gasparaitis et al. . |
| 4,744,012 | 5/1988 | Bergkvist . |
| 4,779,166 | 10/1988 | Tanaka et al. ........................ 362/84 |
| 4,788,437 | 11/1988 | Urquhart et al. . |
| 4,830,469 | 5/1989 | Breddels et al. . |
| 4,864,408 | 9/1989 | Bridges ................................ 358/214 |
| 4,868,383 | 9/1989 | Kurtz et al. .......................... 250/228 |
| 4,912,605 | 3/1990 | Whitehead ........................... 362/84 |
| 4,933,779 | 6/1990 | Milch .................................. 358/491 |

Primary Examiner—Ira S. Lazarus
Assistant Examiner—Richard R. Cole
Attorney, Agent, or Firm—David M. Woods

[57] ABSTRACT

An integrating cavity 20 has a diffusely-reflecting wall 22 that includes a fluorescent material for absorbing radiation in an unusable region of the electromagnetic spectrum and emitting radiation in response thereto in a usable region of the spectrum. A light source 10 provides radiation in both regions, which enters the cavity 20 through an input port 18, reflects from the wall 22 and exits through an output slit 24 toward an image plane 26. At least some of the unusable radiation is absorbed by the fluorescent material coating the wall 22 and reemitted as usable radiation toward the image plane 26.

7 Claims, 3 Drawing Sheets

INTEGRATING LIGHT SOURCE UTILIZING A FLUORESCING REFLECTOR FOR IMPROVED LIGHT EMISSION AND COLOR BALANCE

BACKGROUND OF THE INVENTION

1. Field of the Invention

The present invention relates to an integrating light source, and more particularly, to a light source for use in a film scanner employing an image sensor.

2. Background of the Invention

Apparatus such as document and film scanners, which have image sensing arrays to produce an electronic image signal by sensing an original, frequently employ diffuse light sources to illuminate the original. U.S. Pat. No. 4,864,408, issued to Bridges, Sept. 5, 1989, shows a charge-coupled device image sensor in a film-to-video player for sensing light transmitted through a frame of film from a light box. The light box houses a tungsten halogen bulb at one end and a diffuser at the opposite end adjacent the film. An intermediate opaque pyramidal surface, or "flag", prevents direct light from the bulb reaching the diffuser. The pyramidal flag helps to provide a uniform light intensity across the surface of the diffuser.

For a film scanner, operating at normal film projection rates, e.g. 24 frames per second, an intense uniform source of light is required to illuminate the original one line at a time. For optimum scratch suppression, it is also desirable for the light to be diffuse and nearly uniform in angular distribution (i.e., Lambertian). The light source described in U.S. Pat. No. 4,864,408 is designed for a different application, i.e., imaging a stationary frame, and consequently suffers from the drawback that the incandescent light source is not as bright as often desired for a high resolution film scanner. Intense light sources such as Xenon arc lamps and lasers are not produced in a linear configuration like an elongated incandescent lamp and are inconvenient for locating inside a light box.

A film scanner with an intense illumination source is described in U.S. Pat. No. 4,868,383, issued to Kurtz et al, Sept. 19, 1989. A linear light source for a film scanner disclosed therein includes a source of an intense beam of light, such as a Xenon arc lamp, and an elongated cylindrical integrating cavity having diffusely reflective walls. The cavity includes an input port through which the intense beam is introduced into the cavity and an output slit parallel to the long axis of the cylindrical integrating cavity for emitting a uniform line of light.

To provide optimum illumination in a film scanner, it is important to tailor the distribution and color balance of the light from the slit. Many imaging applications require a diffuse source of visible light to produce uniform illumination of an image plane. Thus most lamps need to be enclosed in or directed towards a diffusing means. The diffuser may be a frosted transparent or translucent plate in front of the source or a hollow enclosure or integrating volume such as described in U.S. Pat. No. 4,868,383. In that disclosure, the integrating cavity is preferably machined from a block of diffusely reflecting polytetrafluoro ethylene plastic. Alternatively, the enclosure may incorporate, or be coated with, diffusely reflecting compounds to further diffuse the light. The compounds generally have a relatively uniform reflectance with respect to wavelength in the visible spectrum. For instance, the cavity may be constructed from a material such as aluminum, with a diffusely reflective coating on the internal surfaces, such as barium sulfate based paint.

In U.S. Pat. No. 4,864,408, the housing and baffle parts forming the box are anodized blue. The light reflected off the inner surfaces of the box picks up a blue cast. Because the box is blue, all other colors are absorbed. This is beneficial for the silicon based CCD utilized in this application because devices of this type have relatively poor responses in the blue region. The concentration of dye used in the anodizing process determines how much blue light can be reflected and how much of other colors are absorbed. In this way the lamp box's spectral output can be tuned to the requirements of the CCD without the use of additional spectral filtering parts.

In many cases, the chosen illumination source will produce insufficient radiation in portions of the usable electromagnetic spectrum, but produce substantial radiation elsewhere. The unwanted radiation can be attenuated by absorptive or reflective filtering, and the usable radiation passed on to the imaging system. Further filtering is used to achieve the desired illumination spectrum. This method of spectral shaping, however, results in a waste of potentially useful radiated energy.

SUMMARY OF THE INVENTION

An objective of this invention is to balance the illumination spectrum of the light output from an integrating light volume. This is accomplished according to the invention by incorporating materials in the walls defining the volume which absorb unwanted electromagnetic radiation in an unusable region of the electromagnetic spectrum and emit radiation in another, usable region of the spectrum.

An integrating light source according to the invention applies a diffuse beam of radiation toward an image plane. A light generator produces radiation in both usable and unusable regions of the electromagnetic spectrum. An integrating volume transmits the radiation to the image plane through an exit port in the volume. The radiation undergoes at least one diffuse reflection off one or more diffusely-reflecting walls before exiting the output port. Efficiency is improved by including a material in one or more of the walls that absorbs radiation in the unusable spectral region and emits radiation in response thereto in the usable spectral region.

BRIEF DESCRIPTION OF THE DRAWINGS

The invention will be described in relation to the drawings, wherein.

DESCRIPTION OF THE PREFERRED EMBODIMENT

Figure 1:
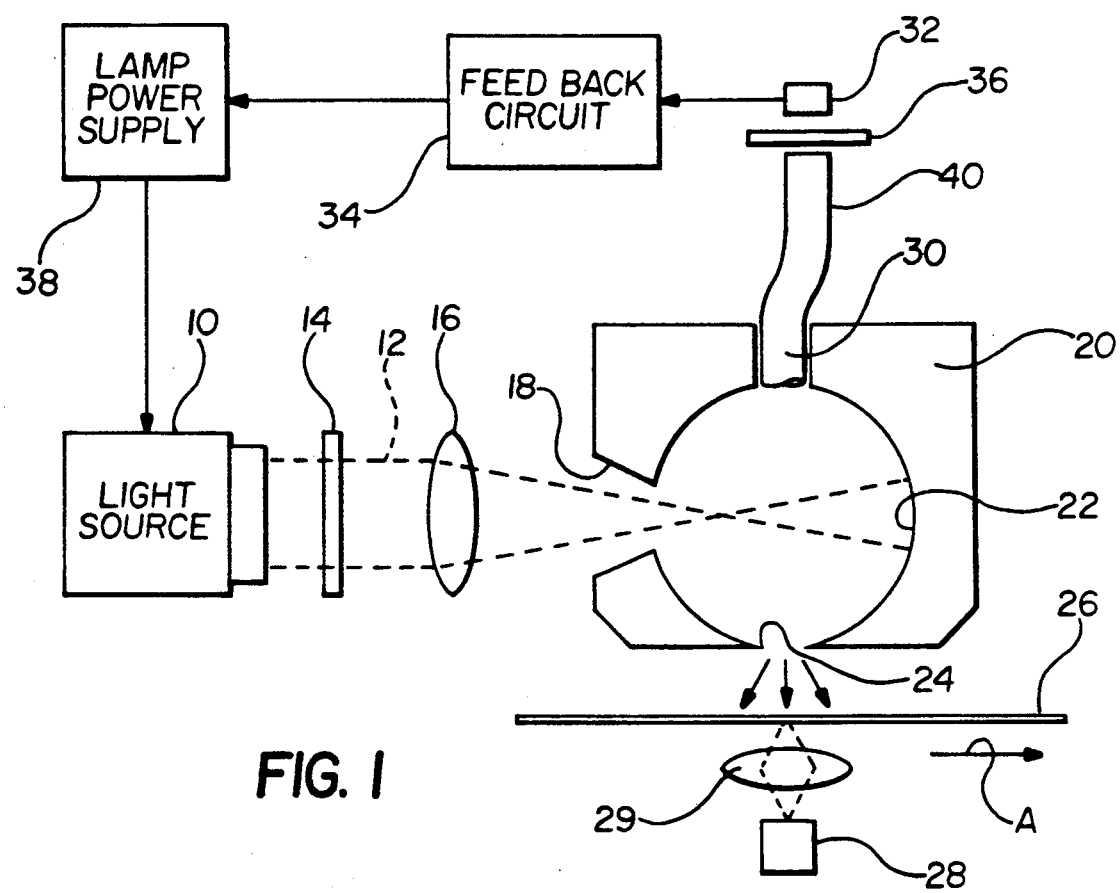
FIG. 1 is a schematic diagram showing a light source with an integrating cavity according to the present invention for use in a film scanner.

Referring to FIG. 1, apparatus for producing a line of illumination in a film scanner according to the present invention is shown schematically. The apparatus includes a light source 10, such as a Xenon arc lamp, for producing an intense beam 12 of light. The light beam 12 is spectrally filtered by a filter 14 to remove infrared radiation, and is focused by a lens 16 onto an input port 18 of a cylindrical integrating cavity 20. Although a cross section of a right circular cylindrical cavity is shown, other cross sections, such as rectangular, elliptical, etc. can be employed. Preferably, the light is brought to a focus just inside the cavity as shown in FIG. 1, and diverges before striking the opposite wall of the cavity.

The internal surface 22 of the integrating cavity is diffusely reflecting due to a diffusely reflective coating on the internal surfaces, such as a barium sulfate-based paint (available as Eastman White ™ from the Eastman Kodak Company, Rochester, New York). In accordance with the invention, the diffusely reflective coating incorporates, or is coated with, a compound containing a fluorescent material that absorbs unwanted radiation from an unusable region of the electromagnetic spectrum, e.g., the ultra-violet region, and emits in a usable spectral region, e.g., the blue visible region, to both color balance the illumination spectrum for the particular application and to increase the intensity of usable light. The internal surface 22 of the integrating cavity may includes conventional fluorescing phosphors, which typically absorb radiation in the ultra-violet region and emit in a broad band with peak responses from 450 nm to 650 nm, depending on their formulation. A well-known fluorescing phosphor bearing these properties is a zinc sulphide phosphor; many other well known phosphors can be selected, e.g., from catalog information provided by GTE Sylvania Products Co. Chemical & Metallurgical Div., Towanda, Pa. 18848. Clearly, the "unusability" and "usability" of the particular spectral region depends upon the particular scanning application (e.g., the spectral response of the film dyes of the particular film being scanned and the spectral response of the Particular sensor being used).

The integrating cavity 20 defines an output slit 24 that emits a line of light to illuminate an image plane 26, where, for example, a strip of film is located. The image on the film is sensed one line at a time by a linear image sensor 28, such as a CCD linear image sensor. The film is imaged on the linear image sensor 28 by a lens 29 and is advanced in the direction of arrow A to effect an area scan of the film image. Since bright light sources, such as Xenon arc lamps, vary in intensity due to wandering of the plasma in the arc, means are provided for stabilizing the output of the light source in time. As disclosed in U.S. Pat. No. 4,868,383, which is incorporated herein by reference, temporal control of the illumination intensity is achieved by sampling the diffuse light from the integrating cavity. Accordingly, a feedback port 30 is provided in the integrating cavity 20 to remove a sample of the diffuse light. The light exiting the feedback port 30 is directed to a photosensor such as a silicon photo diode 32. A neutral density filter 36 is optionally placed over the photocell 32 to control the intensity of the light received. The signal generated by the photocell 32 is detected in a feedback circuit 34, which generates a control signal for the lamp power supply 38, to remove intensity fluctuations from the light source 10. It has been discovered through experimentation, as disclosed in U.S. Pat. No. 4,868,383 that noise in the light intensity distribution from the output slit is further reduced when a fiber optic bundle 40 is employed to direct the light from the integrating cavity 20 to detector 32.

Figure 2:
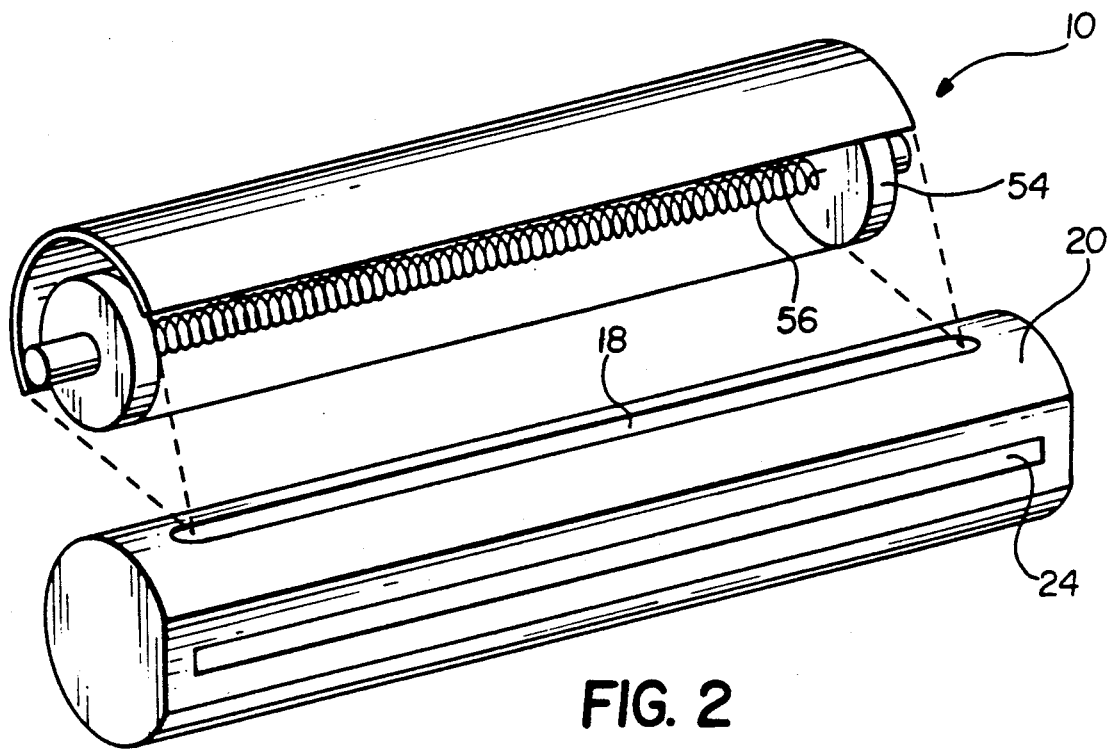
FIG. 2 is a schematic diagram of a further embodiment showing a tungsten light source with an integrating cavity according to the invention.
Figure 3:
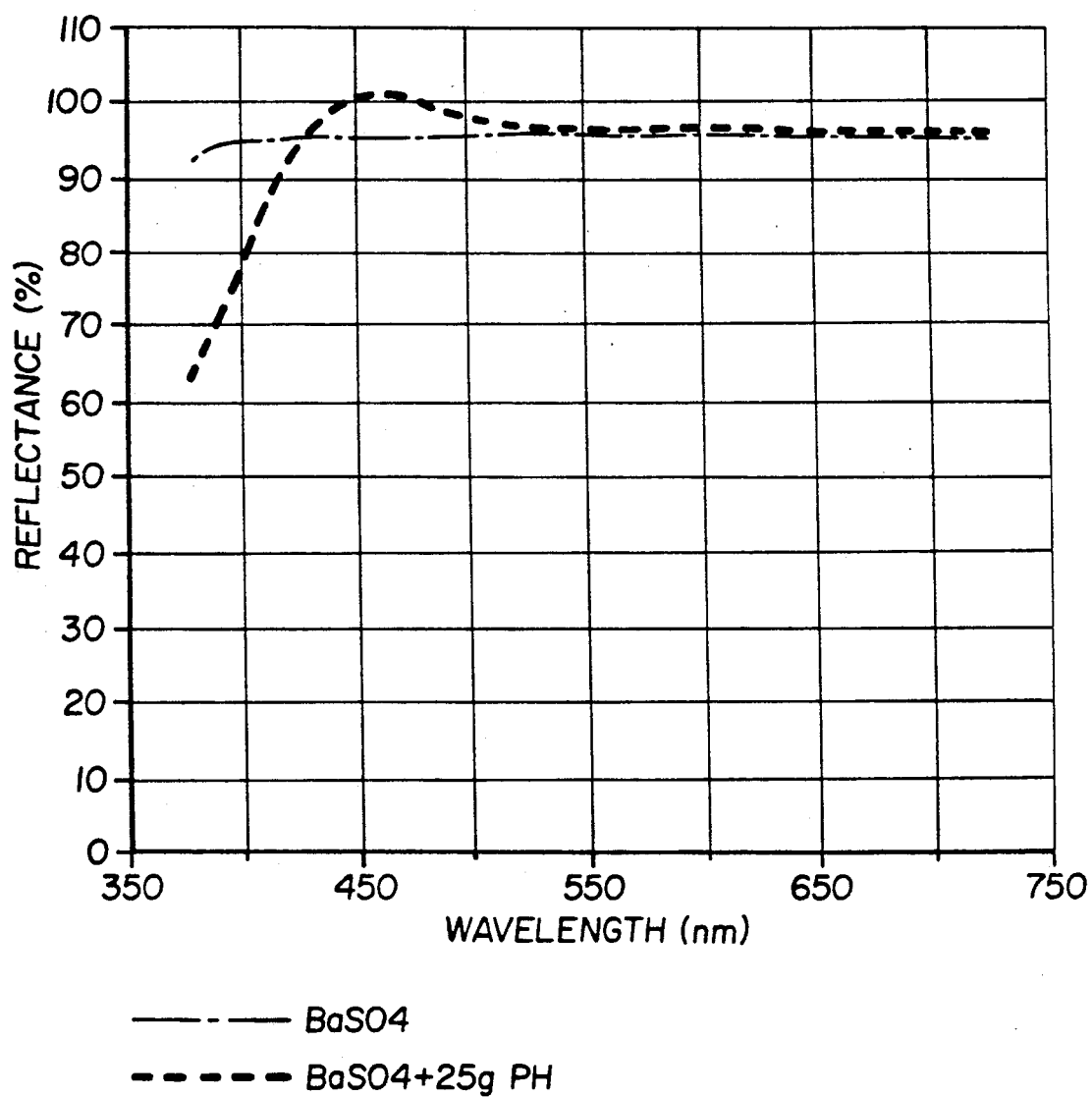
FIG. 3 is an exemplary plot of the reflectance value vs. wavelength for radiation reflected from the internal walls of an integrating cavity of the type shown by FIG. 2, both for a barium sulfate paint alone and for a barium sulfate paint mixed with a phosphor according to the invention.

The advantage of the invention is that energy at wavelengths outside of the desired spectrum can be utilized, increasing the efficiency of the system, reducing the power requirement of the source, allowing lower-cost illumination means, and increasing the signal to noise ratio of the system. For example, the xenon arc lamp used in a film scanner emits substantial quantities of ultraviolet radiation. The incorporation of fluorescent compounds in the optical system (integrating cavity) which absorb ultraviolet and emit in the desired portion of the spectrum provides an efficient means of balancing the illumination spectrum. In such an application, the usual function of the optical filter 14 to block ultra-violet radiation can be deemphasized, or as shown in FIG. 1, the filter 14 can be used to only block infrared radiation.

Where a less intense light source is required, a tungsten lamp with a coiled filament can be employed as the light source 10. For example, FIG. 2 shows an elongated light integrating cavity 20 in which a tungsten lamp 54 with coiled filament 56 is employed as a light source. Light is introduced to the cavity 20 through the elongated port 18. The efficiency and color balance of tungsten sources can be improved as well, since they emit some ultra-violet radiation. The proper choice of phosphors makes a tungsten source viable in a particular application, providing an alternative to the use of expensive and bulky arc or gas-discharge sources. The effect in connection with tungsten illumination is as shown by FIG. 3, where the reflectance vs. wavelength characteristic is plotted for (1) an internal coating of barium sulfide ($BASO_4$) paint and (2) for the barium sulfide paint mixed with a Sylvania 2461 phosphor (a barium magnesium aluminate: Europium phosphor). (For the latter formulation, 25 grams of the phosphor was mixed with 286 grams of the paint). As seen by FIG. 3, for a coating including the phosphor, light is absorbed in the ultra-violet region and emitted in the blue region of the visible spectrum.

Figure 4:
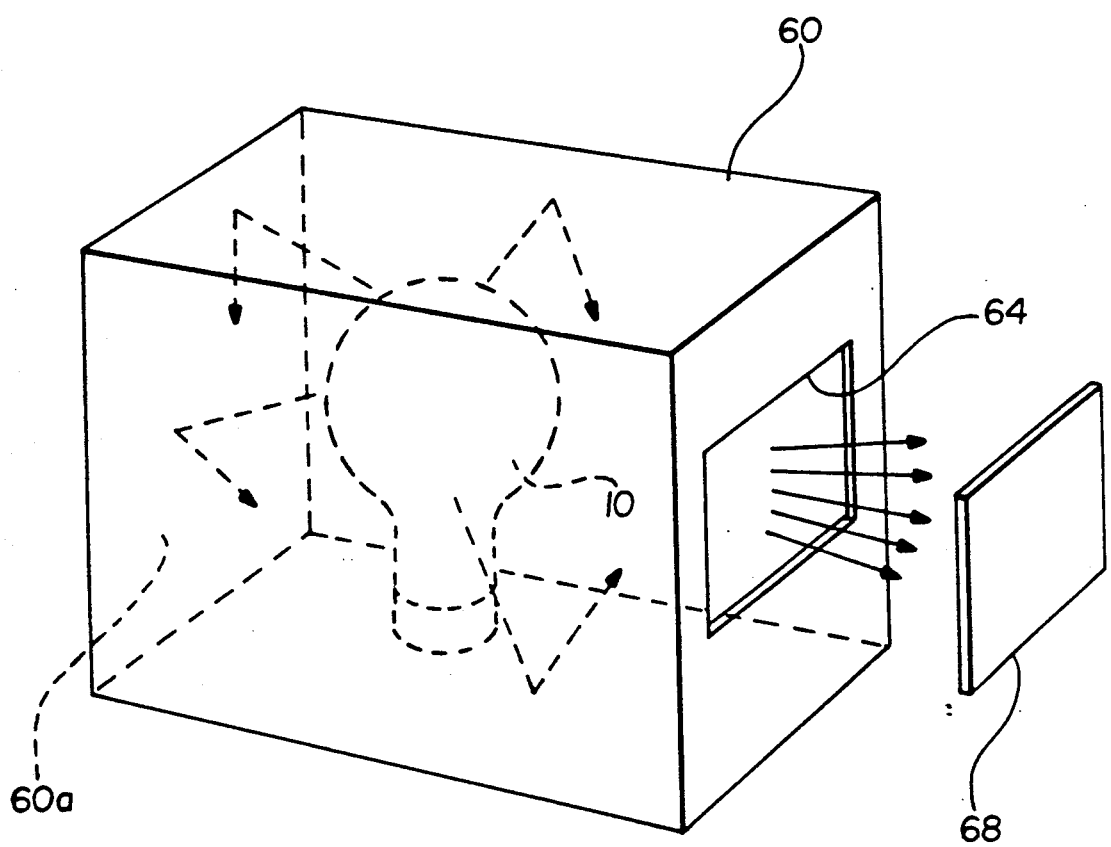
FIG. 4 is a schematic diagram of a further embodiment showing a light source arranged within a light box and utilizing a fluorescent phosphor on at least one wall thereof in accordance with the invention.

As disclosed in U.S. Pat. No. 4,864,408, which is also incorporated herein by reference, an illumination source may sometimes be included inside a light box that produces the diffuse radiation. This is shown in FIG. 4 in relation to the present invention, wherein the light source 10 is a tungsten source actually located within a light box 60 forming an integrating volume. Light is emitted through an exit port 64 toward an image plane 68. As also apparent from that figure, the integrating volume may be other than cylindrical, an orthorhombic volume in this example, and one or more walls may include the fluorescent material. For example, as shown in FIG. 4, the back wall 60a includes the fluorescent material. Alternatively, the exit port 64 itself may be formed of a translucent material containing the fluorescent compounds.

The invention has been described in detail with particular reference to a presently preferred embodiment, but it will be understood that variations and modifications can be effected within the spirit and scope of the invention. For example, while the fluorescent material included with the internal walls 22 may be a coating, as disclosed in connection with FIG. 4, the material may alternatively form the composition of the walls themselves.

What is claimed is:

1. Apparatus for applying a diffuse beam of radiation toward an image plane where radiation in a usable region of the electromagnetic spectrum is used to sense the image, said apparatus comprising:
   a. a light source for producing radiation in both usable and unusable regions of the electromagnetic spectrum; and
   b. a light integrating volume for transmitting the radiation to the image plane, said volume having one or more diffusely reflecting walls and an output port in one of the walls through which a diffuse beam of radiation exits; the radiation undergoing at least one diffuse reflection before exiting the output port, the improvement wherein one or more of said diffusely reflecting walls include a material that absorbs radiation in the unusable spectral region and emits radiation in response thereto in the usable spectral region.

2. Apparatus as claimed in claim 1 in which said light integrating volume includes an input port through which said radiation is introduced into the cavity.

3. Apparatus as claimed in claim 1 in which material included with said walls is a fluorescent material.

4. Apparatus as claimed in claim 3 in which said fluorescent material is a phosphor that absorbs in the ultraviolet region of the spectrum and emits in the visible region.

5. Apparatus as claimed in claim 3 wherein said output port comprises a translucent material that includes said fluorescent material.

6. Apparatus for producing a line of illumination comprising:
   a. a light source for producing a beam of light;
   b. an elongated light integrating cavity having diffusely reflecting walls and defining an input port through which said light beam is introduced into the cavity, and an output slit parallel to the long axis of the cavity through which the line of illumination exits, the light beam being introduced into the cavity such that the light undergoes at least one diffuse reflection before exiting the output slit, the improvement wherein said reflecting walls comprise a material that absorbs radiation in an unusable spectral region and emits radiation in another, usable spectral region.

7. Apparatus for applying a diffuse beam of radiation toward an image plane where radiation in a usable region of the electromagnetic spectrum is used to sense the image, said apparatus comprising:
   a. a light box for transmitting the radiation to the image plane, said light box having one or more walls capable of diffusing the radiation and an output port in one of the walls through which a diffuse beam of radiation exits; the improvement wherein one or more of said radiation diffusing walls include a material that absorbs radiation in an unusable spectral region and emits radiation in response thereto in the usable spectral region; and
   b. a light source located inside said light box for producing radiation in primarily a usable region of the electromagnetic spectrum, but which also produces light in an unusable region of the spectrum.

* * * * *